United States Patent [19]
Moore, Jr. et al.

[11] Patent Number: 6,082,972
[45] Date of Patent: Jul. 4, 2000

[54] OIL LEVEL SIGHT GLASS FOR A COMPRESSOR

[75] Inventors: Billy W. Moore, Jr., Hot Springs; Scott Westberg, Arkadelphia, both of Ark.

[73] Assignee: Carrier Corporation, Farmington, Conn.

[21] Appl. No.: 09/114,269

[22] Filed: Jul. 13, 1998

[51] Int. Cl.⁷ .............................. F04B 49/00; F25B 49/00
[52] U.S. Cl. .................................. 417/63; 62/126; 417/53
[58] Field of Search ........................... 417/63, 53; 418/2; 73/232, 323; 62/126; 184/108

[56] References Cited

U.S. PATENT DOCUMENTS

| | | | |
|---|---|---|---|
| 1,210,385 | 12/1916 | Hunziker | 62/126 |
| 1,250,664 | 12/1917 | Ronk | 62/126 |
| 2,681,034 | 6/1954 | Mannion | 62/126 |
| 2,706,463 | 4/1955 | Bunn | 62/126 |
| 2,744,487 | 5/1956 | Moore et al. | 62/126 |
| 3,722,537 | 3/1973 | Gregerson et al. | 137/559 |
| 4,842,492 | 6/1989 | Gannaway | 417/312 |
| 4,889,471 | 12/1989 | Izunaga et al. | 417/32 |
| 5,765,994 | 6/1998 | Barbier | 417/12 |
| 5,852,937 | 12/1998 | Westermeyer et al. | 62/125 |

*Primary Examiner*—Charles G. Freay
*Assistant Examiner*—Robert Z. Evora
*Attorney, Agent, or Firm*—Howard & Howard

[57] ABSTRACT

The present invention relates to an oil level sight glass for a compressor. The oil level sight glass is at an angle relative to a longitudinal housing axis, such that it can be rotated to achieve an improved position for seeing the sight glass. The sight glass housing further includes an oil return valve which permits return of oil into the oil sump through the sight glass housing.

18 Claims, 3 Drawing Sheets

OIL LEVEL SIGHT GLASS FOR A COMPRESSOR

BACKGROUND OF THE INVENTION

This invention relates generally to compressors and, more particularly, to a sight glass which permits a user to determine an oil level in a compressor.

A typical compressor includes several compartments which must remain sealed from each other and the environment in order for the compressor to function properly. One of these compartments includes an oil sump containing oil. Proper functioning of the compressor requires that the oil level in the oil sump be maintained at an appropriate level. Thus, it is necessary to have a device for determining the oil level within the oil sump. Past solutions to this problem have not been entirely satisfactory. Because the chamber containing the oil sump must remain sealed, it is necessary to have a device which permits an oil level to be determined while maintaining the integrity of the chamber.

In the prior art, there has typically been a separate oil return line returning oil to the compressor from other system components. Thus, there is an additional fluid connection which must be maintained fluid tight.

Thus, it is desirable to have a simple, reliable, and effective device for determining an oil level in an oil sump of a compressor. It is furthermore desirable to have a device which permits a rapid determination of the oil level in the oil sump.

The prior art sight glass was aligned on the axis where the sight glass housing is attached to the compressor housing. Thus, the relative orientation of the sight glass and the compressor cannot be adjusted. The particular orientation of the compressor and its associated components is such that in some applications it may be difficult to see the sight glass.

SUMMARY OF THE INVENTION

In general terms, this invention provides an oil level sight glass for a compressor. In a first embodiment, the oil level sight glass comprises a housing having an open first end and a closed second end, wherein the housing defines an interior chamber that is adapted to communicate with a oil sump of a compressor. The first end of the housing is adapted to be secured to a compressor. The housing also includes a first aperture that is in communication with the interior chamber and that receives a sight glass. The sight glass permits visualization of an oil level in an oil sump of a compressor. In a preferred embodiment, the housing additionally includes an oil return valve and the sight glass is at a ninety degree angle to a longitudinal axis of the housing. In a second embodiment, the sight glass is at a forty-five degree angle relative to the longitudinal axis. The angles allow the housing to be rotated to change the orientation of the sight glass. Thus, the sight glass housing can be rotated such that it can be positioned to be as visible as possible given the position of the compressor and its associated components.

In addition, including the oil return valve with the sight glass housing, eliminates the separate fluid attachment of the prior art.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
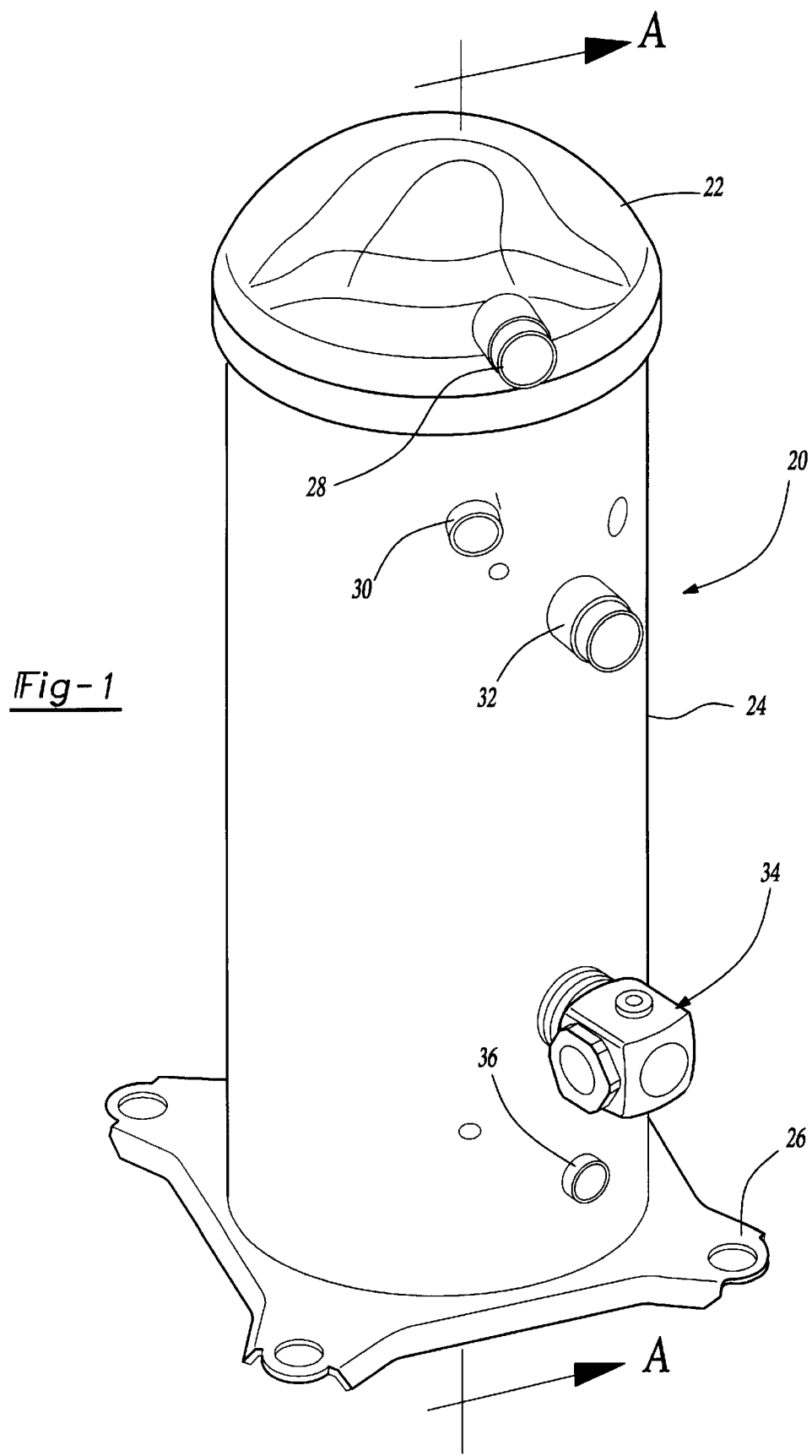
FIG. 1 is a side view of a compressor designed according to the present invention.

A compressor designed according to the present invention is shown generally at 20 in FIG. 1. Compressor 20 comprises an upper shell assembly 22, a central shell assembly 24, and a lower shell assembly 26. A discharge fitting 28 is located on the upper shell assembly 22. An economizer fitting 30 and a suction fitting 32 are in communication with the interior of central shell assembly 24. A sight glass housing 34 extends from and is connected to central shell assembly 24. An oil drain fitting 36 passes through central shell assembly 24.

Figure 2:
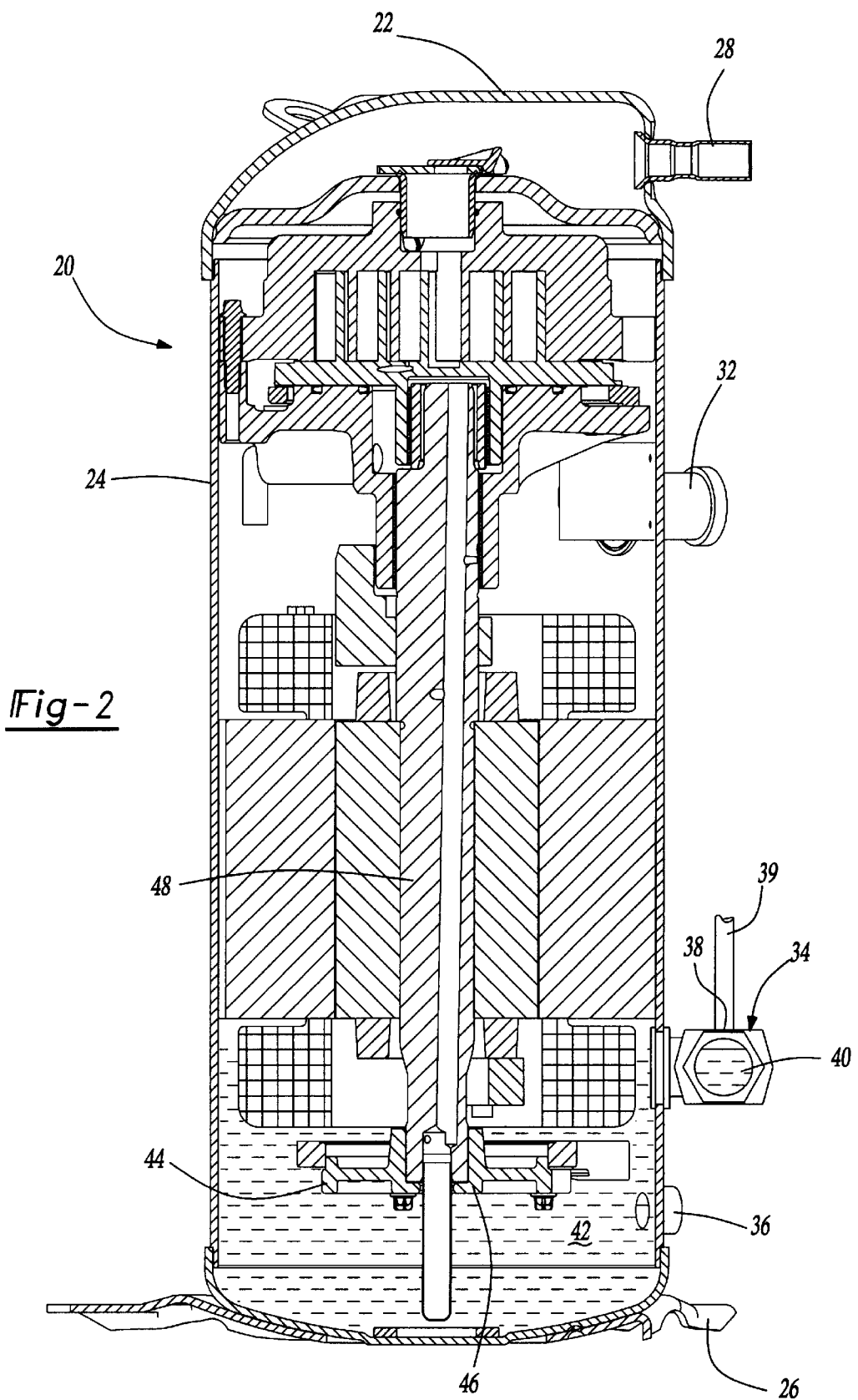
FIG. 2 is a cross-sectional view along line A—A of FIG. 1.

FIG. 2 is a cross-sectional view along line A—A of FIG. 1. Sight glass housing 34 includes an oil return valve 38. Preferably, oil return valve 38 is a check valve of a known type. As shown, an oil return tube 39 will be connected to valve 38 to return oil from the system to which compressor 20 is incorporated. Incorporating the return tube 39 into the housing 34 eliminates an additional fluid connection required in the prior art.

A sight glass 40 permits visualization through sight glass housing 34 of an oil level in an oil sump 42. Central shell assembly 24 encloses a lower bearing 44, a thrust washer 46, and an eccentric shaft assembly 48. Compressor 20 as disclosed, preferably comprises a scroll compressor. As will be understood by one having ordinary skill in the art, compressor 20 could comprise any other sort of compressor other than a scroll compressor. Central shell assembly 24 is preferably welded to upper shell assembly 22 and lower shell assembly 26.

Figure 3:
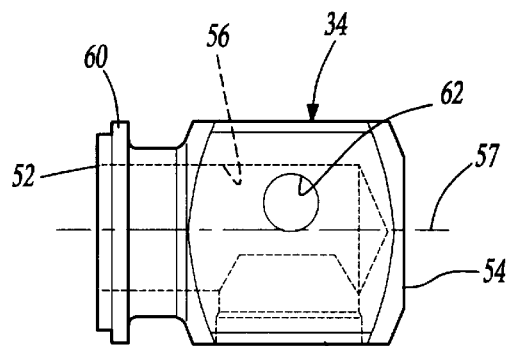
FIG. 3 is a top plan view of a sight glass housing designed according to the present invention.

FIG. 3 is a top plan view of sight glass housing 34. Sight glass housing 34 includes an open first end 52 and a closed second end 54. An interior chamber 56 is defined within sight glass housing 34. A longitudinal axis 57 of sight glass housing 34 is shown in FIG. 3. A first aperture 58 extends from the outer surface of sight glass housing 34 into interior chamber 56. As described below, first aperture 58 is adapted to accommodate sight glass 40. Preferably, first aperture 58 is at a ninety degree angle relative to longitudinal axis 57. A flange 60 is located adjacent first end 52. A second aperture 62 extends from the outside of sight glass housing 34 into interior chamber 56.

Figure 4:
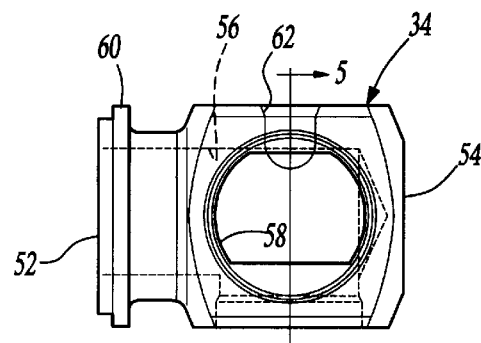
FIG. 4 is a side view of the sight glass housing shown in FIG. 3.

FIG. 4 is a side view of sight glass housing 34. As can be seen in FIG. 4, first aperture 58 and second aperture 62 are in communication with interior chamber 56.

Figure 5:
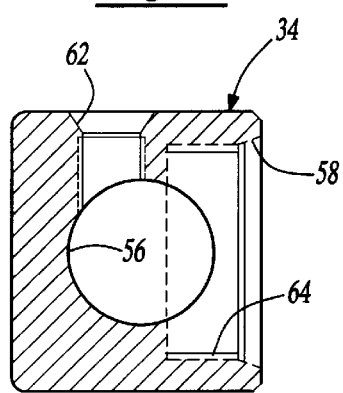
FIG. 5 is a cross-sectional view along line 5—5 of FIG. 4.

FIG. 5 is cross-sectional view along line 5—5 of FIG. 4. Preferably, second aperture 62 is designed to accommodate an oil return valve 38 as is known in the art. As shown in FIG. 5, first aperture 58 and second aperture 62 are in communication with interior chamber 56. Preferably, first aperture 58 includes an inner surface 64 having threads.

Figure 6:
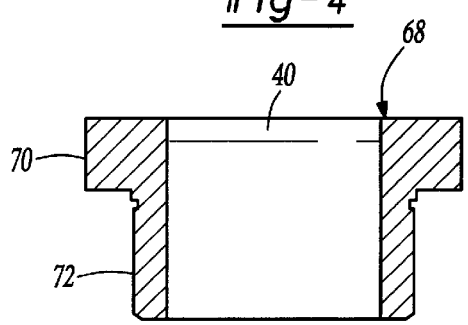
FIG. 6 is a cross-sectional view of a retainer for a sight glass designed according to the present invention.

A cross-sectional view of a sight glass retainer for holding sight glass 40 is shown generally at 68 in FIG. 6. Preferably, retainer 68 includes a shaped flange 70 and a lower portion 72 having threads adapted to engage the threads on inner surface 64. Preferably, shaped flange 70 has a hexagonal or octagonal shape to it which permits a wrench (not shown) to be used to thread retainer 68 into first aperture 58.

Figure 7:
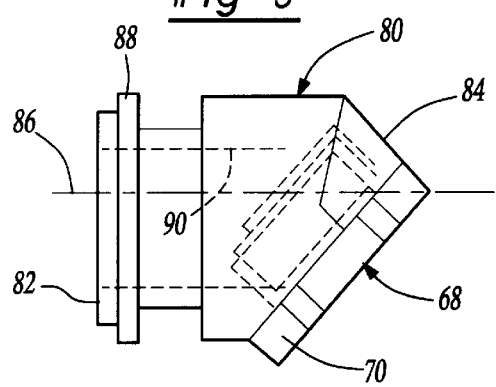
FIG. 7 is a top plan view of another embodiment of a sight glass housing designed according to the present invention.

An alternative embodiment of a sight glass housing is shown generally at 80 in FIG. 7. Sight glass housing 80 includes an open first end 82 and a closed second end 84. A longitudinal axis 86 extends through sight glass housing 80. A flange 88 is located adjacent first end 82. Sight glass housing 80 defines an interior chamber 90. Sight glass retainer 68 threads into a first aperture 92 (shown in FIG. 8).

Figure 8:
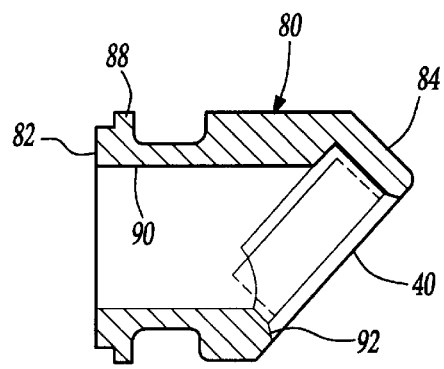
FIG. 8 is a cross-sectional view of FIG. 7.

FIG. 8 is a cross-sectional view of sight glass housing 80 as shown in FIG. 7. Preferably, first aperture 92 includes a threaded surface for accommodating sight glass retainer 68. Preferably, in sight glass housing 80, the sight glass 40 is at an angle of approximately forty-five degrees to longitudinal axis 86. Sight glass housing 80 also includes second aperture 62 (not shown) which is in communication with interior chamber 90. As described above, second aperture 62 preferably, includes oil return valve 38.

Preferably, flange 60 and 88 of sight glass housing 34 or 80 is welded to central shell assembly 24. In a preferred embodiment, oil return valve 38 returns oil into interior chamber 56 or 90 and thereby into oil sump 42.

The angle orientation of the sight glass 40 in the two embodiments allows the sight glass 40 to be positioned at a desired angle such that it will be easily seen once the compressor 20 is mounted. Thus, in different applications, the final position of the sight glass 40 will be rotated to provide a better view. The prior art sight glass which is aligned on the axis to which it is attached to the housing cannot be adjusted in this way.

Figure 9:
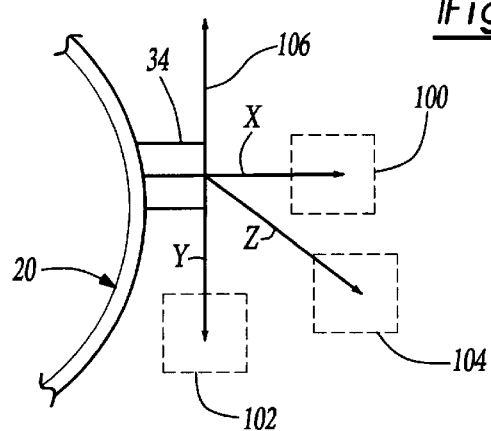
FIG. 9 shows a method of utilizing the present invention.

FIG. 9 shows the method of using the inventive sight glass 40. The longitudinal axis X at which the sight glass housing 34 is attached is the prior art. An obstruction 100, which might be a refrigerant system component might block the view of this prior art sight glass along axis X.

The present invention allows the selection of the ninety degree embodiment (axis Y) or the forty-five degree embodiment (axis Z), to avoid obstructions 102 or 104. Further, the sight glass housing 34 and compressor 20 can be rotated such that the sight glass 40 is at another angle such as 106. Thus, by rotating the sight glass housing 34 relative to the longitudinal axis of the housing opening, one can position the sight glass 40 to be at an optimum orientation for the particular application.

The present invention has been described in accordance with the relevant legal standards, thus the foregoing description is exemplary rather than limiting in nature. Variations and modifications to the disclosed embodiment may become apparent to those skilled in the art and do come within the scope of this invention.

Accordingly, the scope of legal protection afforded this invention can only be determined by studying the following claims.

We claim:

1. A compressor comprising:

A sealed compressor having an oil sump;

a sight glass housing having an open first end and a closed second end, said housing defining an interior chamber, said interior chamber adapted to communicate with an oil sump of a compressor;

said first end secured to said compressor; and a first aperture in said housing, said first aperture in communication with said interior chamber and receiving a sight glass, said sight glass permitting visualization of an oil level in an oil sump of a compressor, and an oil return valve included in said sight glass housing.

2. A compressor as recited in claim 1 wherein said first end further includes a flange, said flange adapted to be secured around an opening in communication with an oil sump of a compressor.

3. A compressor as recited in claim 1 wherein said sight glass is at an angle to a longitudinal axis of said housing.

4. A compressor as recited in claim 3 wherein said sight glass is at approximately a ninety degree angle to a longitudinal axis of said housing.

5. A compressor as recited in claim 3 wherein said sight glass is at approximately a forty-five degree angle to a longitudinal axis of said housing.

6. A compressor as recited in claim 1 wherein said first aperture includes a set of threads and said sight glass is enclosed in a retainer having threads adapted to engage said threads of said first aperture.

7. A compressor as recited in claim 6 wherein said retainer of said sight glass includes a shaped flange, said shaped flange adapted to be engaged by a wrench for rotating said sight glass retainer.

8. A compressor comprising:

a sealed compressor having an oil sump;

a sight glass housing having an open first end and a closed second end, said housing defining an interior chamber, said housing secured to said compressor in an opening, a longitudinal axis extending outwardly of said opening;

said first end secured to said compressor and said interior chamber in communication with said oil sump of said compressor; and a first aperture in said housing, said first aperture in communication with said interior chamber and receiving a sight glass, said sight glass permitting determination of an oil level in said oil sump, said first aperture being at a non-parallel angle relative to said longitudinal axis.

9. A compressor as recited in claim 8 wherein said first end further includes a flange, said flange secured around said opening in communication with said oil sump.

10. A compressor as recited in claim 8 wherein said sight glass is at approximately a ninety degree angle to said longitudinal axis.

11. A compressor as recited in claim 8 wherein said sight glass is at approximately a forty-five degree angle to a longitudinal axis of said housing.

12. A compressor as recited in claim 8 wherein said first aperture includes a set of threads and said sight glass is enclosed in a retainer having threads adapted to engage said threads of said first aperture.

13. A compressor as recited in claim 12 wherein said retainer of said sight glass includes a shaped flange, said shaped flange adapted to be engaged by a wrench for rotating said sight glass housing.

14. A compressor as recited in claim 8 wherein said housing includes a second aperture, said second aperture in communication with said interior chamber; and said second aperture adapted to return oil into said interior chamber.

15. A compressor as recited in claim 14 wherein said second aperture includes a valve.

16. A compressor as recited in claim 8 wherein said compressor is a scroll compressor.

17. A compressor comprising:

a sealed compressor housing including an oil sump;

a sight glass housing having an open first end and a closed second end, said housing defining an interior chamber, said interior chamber adapted to communicate with an oil sump of a compressor;

said first end secured to an opening in said compressor said opening defining a longitudinal axis;

a first aperture in said housing, said first aperture in communication with said interior chamber and receiving a sight glass, said sight glass permitting visualization of an oil level in an oil sump of a compressor, and said sight glass being at a non-parallel angle relative to said longitudinal axis; and a second aperture in said housing, said second aperture in communication with said interior chamber, and said second aperture adapted to return oil to said interior chamber.

18. A method of assembling a compressor comprising:

1) providing a compressor having an oil sight glass opening defining a longitudinal axis, providing an oil sight glass housing having one end to be mounted in said opening, and a sight glass at a non-parallel axis relative to said longitudinal axis;

2) mounting said housing in said opening and rotating said housing such that said sight glass is a desired orientation.

\* \* \* \* \*